US008111307B2

(12) United States Patent
Deever et al.

(10) Patent No.: US 8,111,307 B2
(45) Date of Patent: Feb. 7, 2012

(54) DEFECTIVE COLOR AND PANCHROMATIC CFA IMAGE

(75) Inventors: Aaron T. Deever, Pittsford, NY (US); James E. Adams, Jr., Rochester, NY (US); John F. Hamilton, Jr., Mendon, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 565 days.

(21) Appl. No.: 12/258,389

(22) Filed: Oct. 25, 2008

(65) Prior Publication Data

US 2010/0104209 A1    Apr. 29, 2010

(51) Int. Cl.
H04N 9/64 (2006.01)
H04N 9/083 (2006.01)

(52) U.S. Cl. ........................................ 348/246; 348/272

(58) Field of Classification Search .......... 348/277–282, 348/241, 245, 246, 264, 265, 272
See application file for complete search history.

(56) References Cited

U.S. PATENT DOCUMENTS

| 3,971,065 | A |   | 7/1976 | Bayer |
| 4,246,601 | A | * | 1/1981 | Sato et al. ................. 348/277 |
| 4,390,895 | A |   | 6/1983 | Sato et al. |
| 5,323,233 | A |   | 6/1994 | Yamagami et al. |
| 6,441,848 | B1 |  | 8/2002 | Tull |
| 6,476,865 | B1 |  | 11/2002 | Gindele et al. |
| 6,714,239 | B2 |  | 3/2004 | Guidash |
| 6,759,646 | B1 |  | 7/2004 | Acharya et al. |
| 6,937,774 | B1 |  | 8/2005 | Specht et al. |
| 7,340,099 | B2 |  | 3/2008 | Zhang |
| 7,671,316 | B2 |  | 3/2010 | Kanai et al. |
| 7,839,437 | B2 | * | 11/2010 | Kasai et al. .................... 348/238 |
| 2002/0158977 | A1 | * | 10/2002 | Hamilton, Jr. ................ 348/246 |
| 2004/0212723 | A1 |  | 10/2004 | Lin |
| 2006/0017829 | A1 |  | 1/2006 | Gallagher |
| 2006/0017837 | A1 |  | 1/2006 | Soreko et al. |
| 2006/0139470 | A1 |  | 6/2006 | McGowan |
| 2006/0187308 | A1 |  | 8/2006 | Lim et al. |

(Continued)

FOREIGN PATENT DOCUMENTS

EP    0913869    5/1999

(Continued)

OTHER PUBLICATIONS

International Preliminary Report on Patentability mailed Nov. 2, 2010, for International Patent Application No. PCT/US2009/002329, 7 pages.

(Continued)

*Primary Examiner* — David Ometz
*Assistant Examiner* — Ahmed A Berhan
(74) *Attorney, Agent, or Firm* — Blakely Sokoloff Taylor & Zafman LLP

(57) ABSTRACT

A method of improving a first color filter array image from an image sensor having a plurality of color channels and a panchromatic channel, includes capturing the panchromatic channel at a different exposure time than at least one of the color channels with the image sensor; using the color channels to provide a luminance channel; and analyzing the color filter array image and the luminance channel to determine defective pixels in the color channels and using neighboring color and luminance pixel values to improve the defective pixels to produce a second color filter array image or full-color image having at least one improved channel.

16 Claims, 21 Drawing Sheets

U.S. PATENT DOCUMENTS

| | | |
|---|---|---|
| 2007/0024931 A1 | 2/2007 | Compton et al. |
| 2007/0046807 A1 | 3/2007 | Hamilton et al. |
| 2007/0223831 A1 | 9/2007 | Mei et al. |
| 2007/0285526 A1 | 12/2007 | Mann et al. |
| 2008/0012969 A1* | 1/2008 | Kasai et al. ............ 348/266 |
| 2008/0043128 A1 | 2/2008 | Poonnen et al. |
| 2008/0129752 A1 | 6/2008 | Riley et al. |
| 2008/0218597 A1 | 9/2008 | Cho |
| 2009/0091645 A1 | 4/2009 | Trimeche et al. |
| 2009/0268055 A1 | 10/2009 | Hamilton, Jr. et al. |

FOREIGN PATENT DOCUMENTS

| | | |
|---|---|---|
| GB | 2 345 217 A | 6/2000 |
| JP | 2007 288549 A | 11/2007 |

OTHER PUBLICATIONS

International Search Report mailed Jul. 15, 2009, for International Patent Application No. PCT/US2009/002329, 4 pages.

International Preliminary Report on Patentability mailed Apr. 26, 2011, for International Patent Application No. PCT/US2009/005531, 8 pages.

International Search Report mailed Mar. 30, 2010, for International Patent Application No. PCT/US2009/00005531, 6 pages.

* cited by examiner

FIG. 5

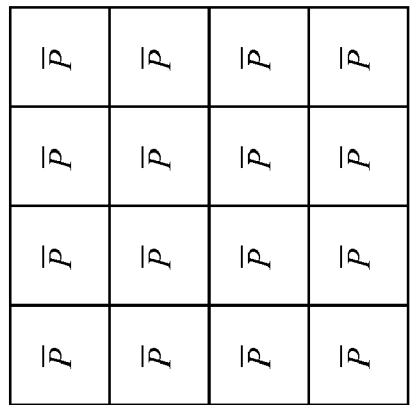
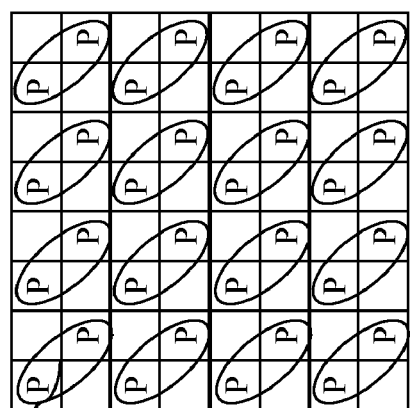
FIG. 7A

DEFECTIVE COLOR AND PANCHROMATIC CFA IMAGE

CROSS REFERENCE TO RELATED APPLICATION

Reference is made to commonly assigned U.S. patent application Ser. No. 12/111,219 filed Apr. 29, 2008, entitled "Concentric Exposure Sequence for Image Sensor" by John F. Hamilton, Jr. et al, the disclosure of which is incorporated herein by reference.

FIELD OF THE INVENTION

The present invention relates to color filter array images having color channels and a panchromatic channel and more particularly to providing an improved color filter array image or full-color image.

BACKGROUND OF THE INVENTION

An electronic imaging system depends on a lens system to form an image on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). A sensor includes a two-dimensional array of individual picture element sensors, or pixels. Each pixel is typically provided with either a red, green, or blue filter, as described by Bayer in commonly assigned U.S. Pat. No. 3,971,065, so that a full-color image can be produced. Regardless of electronic technology employed, e.g., CCD or CMOS, the pixel acts as a bucket in which photoelectrons are accumulated in direct proportion to amount of light that strikes the pixel during the capture of an image by the electronic imaging system.

Not all of the light that enters the front optical element of an electronic imaging system strikes a pixel. Much of the light is lost when passing through the optical path of the electronic imaging system. Typically, about 5% of the light is lost due to lens reflections and haze and about 60% is lost because of the color filter array. Moreover, some of the light strikes areas of the pixel that are not light sensitive. To gather the amount of light that is needed to make a correct exposure, the electronic imaging sensor gathers light for an interval of time called the exposure time. Based on brightness measurements of the scene to be imaged, the electronic imaging system, typically an automatic exposure control, is employed to determine a suitable exposure time that will yield an image with effective brightness. The dimmer the scene, the larger the amount of time the electronic imaging system needs to gather light to make a correct exposure. It is well known, however, that longer exposures can result in blurry images. This blur can be the result of objects moving in a scene. It can also be produced when the image capture device is moving relative to the scene during capture.

One method to reduce blur is to shorten the exposure time. This method under-exposes the electronic image sensor during image capture so dark images are generated. An analog or digital gain can be applied to the image signal to brighten the dark images, but those skilled in the art will recognize that this will result in noisy images.

Another method to reduce blur is to shorten the exposure time and preserve more of the light that passes through the optical path and direct it to the pixels of the electronic image sensor. This method can produce images with reduced blur and acceptable noise levels. However, the current industry trend in electronic imaging systems is to make imaging systems smaller and less expensive. High-grade optical elements with large apertures, which can gather more light and preserve more light passing through them, are therefore not practicable.

Another method to reduce blur is to shorten the exposure time and supplement the available light with a photographic flash. A photographic flash produces a strong light flux that is sustained for a fraction of a second and the exposure time is set to encompass the flash time. The exposure time can be set to a significantly shorter interval than without a flash since the photographic flash is strong. Therefore, the blur during the exposure is reduced. However, objects in bright daylight can still have motion blur, flash photography is most useful if the distance between the flash and the object is small, and a flash adds extra cost and weight to an image capture device.

U.S. Pat. No. 6,441,848 to Tull describes a digital camera with an electronic image sensor that removes object motion blur by monitoring the rate at which electrons are collected by each pixel. If the rate at which light strikes a pixel varies, then the brightness of the image that the pixel is viewing is assumed to be changing. When a circuit built into the sensor array detects that the image brightness is changing, the amount of charge collected is preserved and the time at which brightness change was detected is recorded. Each pixel value where exposure was stopped is adjusted to the proper value by linearly extrapolating the pixel value so that the pixel value corresponds to the dynamic range of the entire image. A disadvantage of this approach is that the extrapolated pixel values, of an object that is already in motion when the exposure begins, are highly uncertain. The image brightness, as seen by the sensor, never has a constant value and, therefore, the uncertainty in the extrapolated pixel values results in an image with motion artifacts. Another disadvantage is that it uses specialized hardware so it cannot be used with the conventional electronic image sensors that are used in current commercial cameras.

Another method to reduce blur is to capture two images, one with a short exposure time, and one with a long exposure time. The short exposure time is selected so as to generate an image that is noisy, but relatively free of motion blur. The long exposure time is selected so as to generate an image that has little noise, but that can have significant motion blur. Image processing algorithms are used to combine the two captures into one final output image. Such approaches are described in U.S. Pat. No. 7,239,342, U.S. Patent Application Publication No. 2006/0017837, U.S. Patent Application Publication No. 2006/0187308 and U.S. Patent Application Publication No. 2007/0223831. The drawbacks of these approaches include a requirement for additional buffer memory to store multiple images, additional complexity to process multiple images, and difficulty resolving object motion blur.

Another method to reduce blur is to shorten exposure time and preserve more light passing through the color filter array. For silicon-based image sensors, the pixel components themselves are broadly sensitive to visible light, permitting unfiltered pixels to be suitable for capturing a monochrome image. For capturing color images, a two-dimensional pattern of filters is typically fabricated on the pattern of pixels, with different filter materials used to make individual pixels sensitive to only a portion of the visible light spectrum. An example of such a pattern of filters is the well-known Bayer color filter array pattern, as described in U.S. Pat. No. 3,971,065. The Bayer color filter array has advantages for obtaining full color images under typical conditions, however, this solution has been found to have its drawbacks. Although filters are needed to provide narrow-band spectral response, any filtering of the incident light tends to reduce the amount of light that reaches each pixel, thereby reducing the effective light sensitivity of each pixel and reducing pixel response speed.

As solutions for improving image capture under varying light conditions and for improving overall sensitivity of the imaging sensor, modifications to the familiar Bayer pattern have been disclosed. For example, commonly assigned U.S. Patent Application Publication No. 2007/0046807 by Hamilton et al. and U.S. Patent Application Publication No. 2007/0024931 entitled by Compton et al. both describe alternative sensor arrangements that combine color filters with panchromatic filter elements, spatially interleaved in some manner. With this type of solution, some portion of the image sensor detects color; the other panchromatic portion is optimized to detect light spanning the visible band for improved dynamic range and sensitivity. These solutions thus provide a pattern of pixels, some pixels with color filters (providing a narrow-band spectral response) and some without (unfiltered "panchromatic" pixels or pixels filtered to provide a broad-band spectral response). This solution is not sufficient, however, to permit high quality images without motion blur to be captured under low-light conditions.

Another method to reduce blur and capture images in low-light scenarios, known in the fields of astrophotography and remote sensing, is to capture two images: a panchromatic image with high spatial resolution and a multi-spectral image with low spatial resolution. The images are fused to generate a multi-spectral image with high spatial resolution. Such approaches are described in U.S. Pat. Nos. 7,340,099, 6,937,774 and U.S. Patent Application Publication No. 2008/0129752. The drawbacks of these approaches include a requirement for additional buffer memory to store multiple images, and difficulty resolving object motion blur.

Thus, there exists a need for producing an improved color filter array image or full-color image having color and panchromatic pixels, having reduced motion blur, by using conventional electronic image sensors, without the use of a photographic flash, without increasing image noise, and without significant additional cost or complexity or memory requirements.

SUMMARY OF THE INVENTION

The object of this invention is to provide an improved color filter array image or full-color image having color and panchromatic pixels. This object is achieved by a method of improving a first color filter array image from an image sensor having a plurality of color channels and a panchromatic channel, comprising:

(a) capturing the panchromatic channel at a different exposure time than at least one of the color channels with the image sensor;

(b) using the color channels to provide a luminance channel; and (c) analyzing the color filter array image and the luminance channel to determine defective pixels in the color channels and using neighboring color and luminance pixel values to improve the defective pixels to produce a second color filter array image or full-color image having at least one improved channel.

An advantage of the present invention is that improved color filter array images or full-color images with reduced blur can be produced with basic changes to the image processing software without having to use a photographic flash or long exposure times to properly expose a single image.

A further advantage of the present invention is that color filter array images or full-color images with reduced image capture device-induced blur can be produced without the need for costly special lenses with laterally moveable lens elements.

A further advantage of the present invention is that color filter array images or full-color images with reduced blur can be produced without increased buffer memory requirements for storing multiple images.

This and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5 is a view of the pixel readouts from a portion of the image sensor from one binning strategy;

FIG. 7A is a view of the summation of panchromatic pixels to generate a low-resolution panchromatic image for a portion of the image sensor;

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
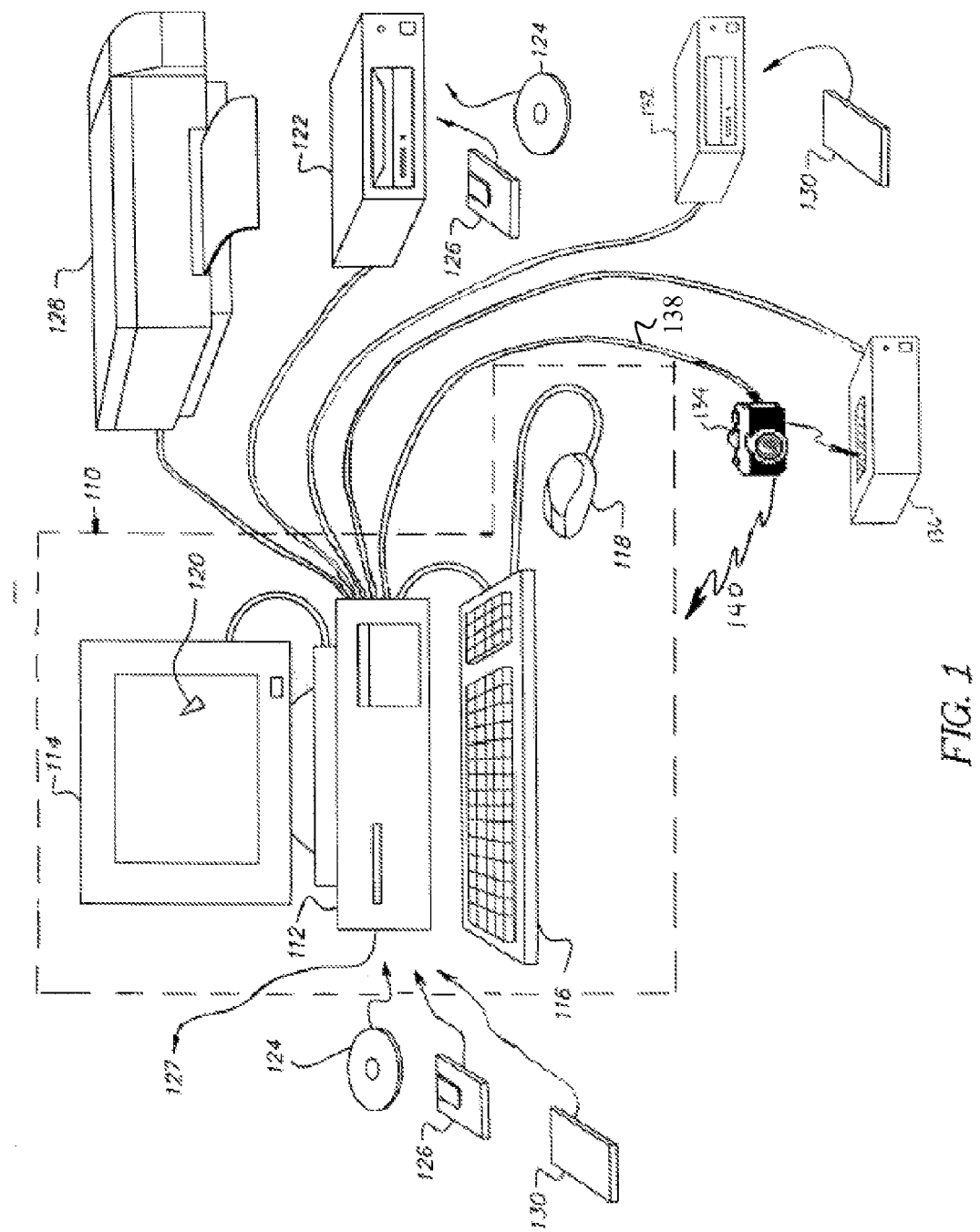
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into an externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the PC card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to color filter array images in order to produce improved color filter array images or full-color images.

In the following, a color filter array image refers to an image captured with an image sensor fabricated with a color filter array pattern on the pixels. A color channel refers to image values corresponding to a particular color filter. Similarly, a panchromatic channel refers to image values corresponding to a panchromatic filter. A full-color image refers to an image for which each color channel is present for every pixel. A full-color image can also have a panchromatic channel present for every pixel. Additional channels, such as a luminance channel, can be created as a function of existing channels.

Figure 2:
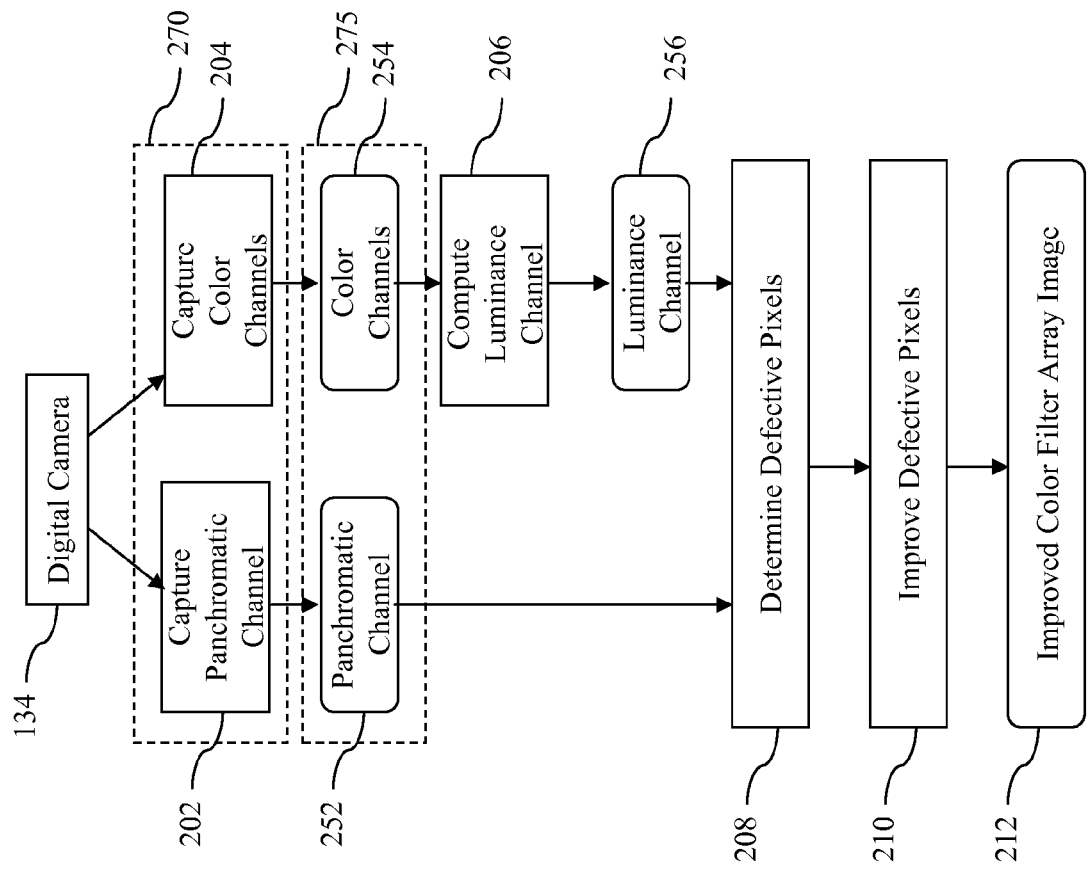
FIG. 2 is a block diagram of a preferred embodiment of the present invention.

FIG. 2 is a high-level diagram of a preferred embodiment of the present invention. A digital camera 134 is used to capture a color filter array image 270. More specifically, the digital camera 134 captures a panchromatic channel 202 and color channels 204. The color filter array can contain red, green, blue and panchromatic pixels, although other channel combinations can be used, such as cyan, magenta, yellow and panchromatic. Of particular importance is the inclusion of panchromatic pixels. A color filter array image 275 is captured in such a way that a panchromatic channel 252 is exposed to light for a different length of time that at least one of color channels 254. The panchromatic channel 252 can have a shorter exposure than each of the color channels 254, and the exposure intervals arranged such that they conclude concurrently. Alternatively, a shorter exposure for the panchromatic channel 252 can be centered temporally within the longer exposure for the color channels 254.

The color channels 254 are used to compute a luminance channel 206. Formulas for computing a luminance channel 206 from color channels 254 are well-known in the art. In a preferred embodiment, the weightings of the color channels 254 are chosen such that a computed luminance channel 256 is comparable to the panchromatic channel 252.

In the next step, the color filter array image 275, in particular, both the panchromatic channel 252 and the computed luminance channel 256, are analyzed to determine defective pixels 208. Defective pixels are defined as those pixels for which the computed luminance pixel value does not match the panchromatic pixel value, and for which the color pixel value needs to be modified. Improved pixels are defined as those for which a modified color pixel value is computed.

In the following step, the defective pixels 208 are improved using neighboring pixels 210. Neighboring pixels 210 can be drawn from an arbitrarily large radius. Neighboring pixels 210 can also be drawn from a radius of zero, implying that the panchromatic, luminance and color values corresponding to the specific defective pixel are used to improve the pixel.

In the final step, the improved defective pixels are incorporated into the color filter array image 275 to form an improved color filter array image 212.

Figure 3:
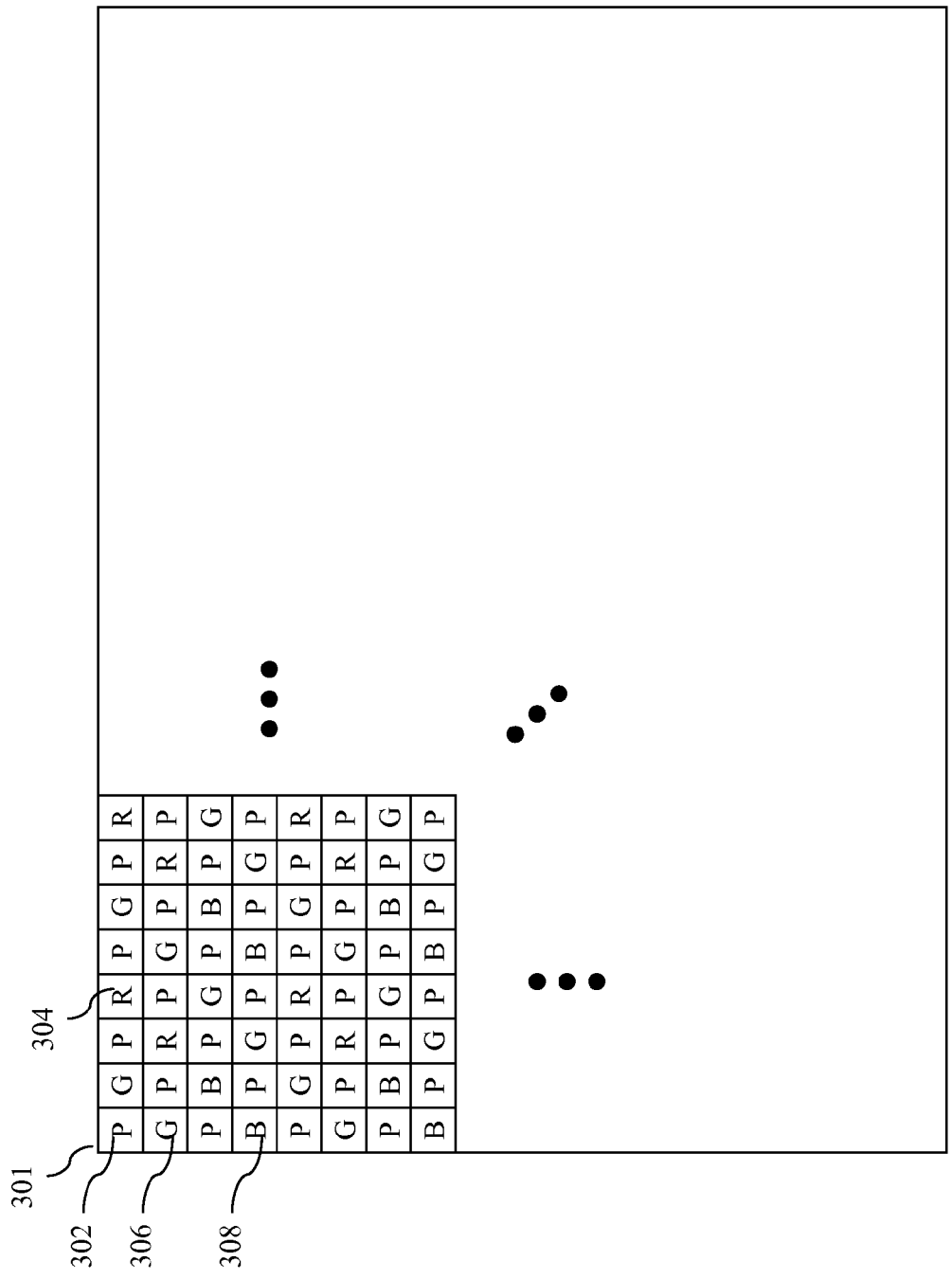
FIG. 3 is a view of a color filter array pattern for the present invention.

The individual steps outlined in FIG. 2 will now be described in greater detail. Initially, a digital camera 134 captures a color filter array image 270. FIG. 3 illustrates an example color filter array pattern 301 for a preferred embodiment. In this example, approximately one half of the pixels are panchromatic 302, while the other half are color pixels split among red (R) 304, green (G) 306 and blue (B) 308.

The exposure period for the panchromatic pixels 302 is shorter than the exposure period for the color pixels. This permits the panchromatic channel 252 to be captured with a short exposure time that prevents excessive motion blur, while also permitting the color channels 254 to be captured with sufficient exposure to prevent excessive color noise artifacts.

Figure 4:
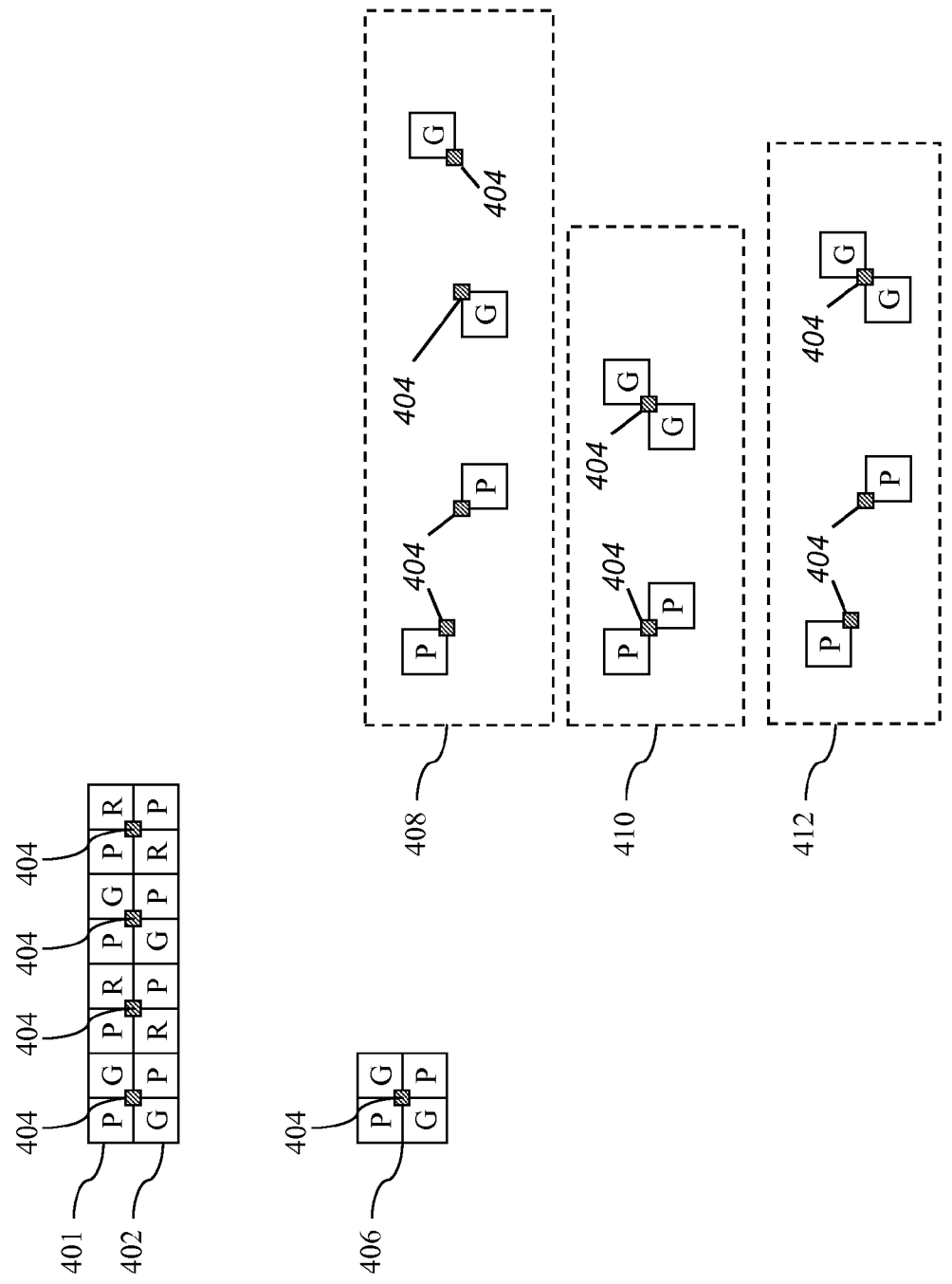
FIG. 4 is a schematic diagram showing how pixels in adjacent rows can be binned together, sharing the same floating diffusion component.

Various pixel binning schemes can be used during readout of the image sensor, as illustrated in FIG. 4. In FIG. 4, two partial rows 401, 402 of an image sensor are displayed. In this example, the underlying readout circuitry for a sensor array uses a floating diffusion 404 that is switchably connected to one or more surrounding pixels at a time. Implementation and use of the floating diffusion is well known to those skilled in the digital image acquisition art. FIG. 4 shows a conventional arrangement in which each floating diffusion 404 serves four surrounding pixels, shown in one example as a quartet 406.

Pixel signals can be switched to floating diffusion 404 in any of a number of combinations. In a readout combination 408, each pixel in quartet 406 has its charge transferred separately to floating diffusion 404 and thus is read individually. In a readout combination 410, panchromatic pixels P are binned, that is, share floating diffusion 404 by emptying their stored charge to floating diffusion 404 at the same time; similarly, both color (G) pixels in the quartet are binned, switching their signals at the same time to floating diffusion 404. In another readout combination 412, panchromatic pixels P are not binned, but are read separately; here color pixels (G) are binned.

Figure 5:
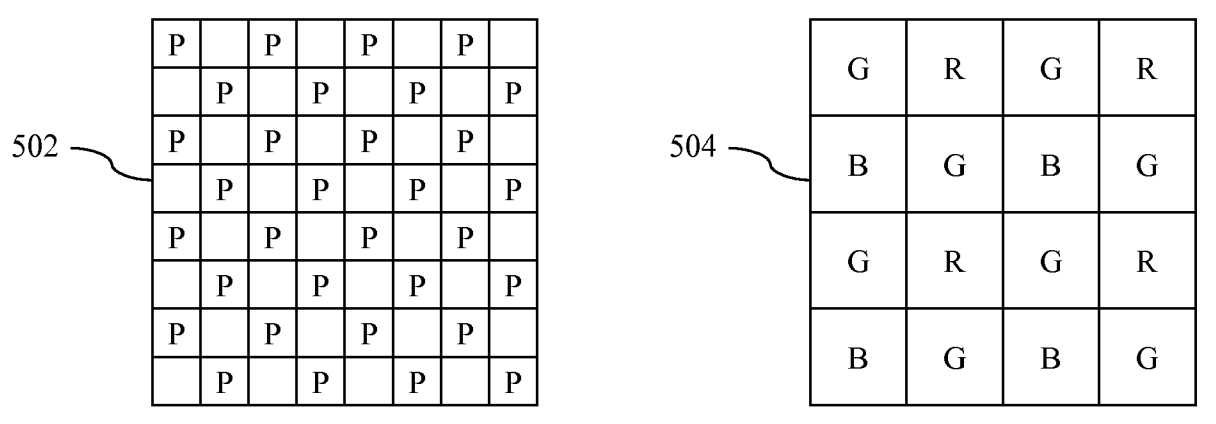

In a preferred embodiment of the present invention, the panchromatic pixels are not binned, while color pixels are binned 412, resulting in the readouts illustrated in FIG. 5. FIG. 5 illustrates the readout for just a portion of the image sensor. In FIG. 5, the panchromatic pixels occupy a checkerboard pattern 502, while the color pixels collectively form a low resolution Bayer pattern 504.

After the color filter array image 275 has been readout from the sensor, the color channels 254 are used to compute a luminance channel 206. A computationally simple calculation for luminance is given by L=R+2G+B. In a preferred embodiment, the spectral responses of the red, green, blue, and panchromatic pixels are measured, as illustrated in FIG. 6, and the luminance channel 256 is calculated as a linear combination of red, green and blue that gives an effective fit with the panchromatic channel.

Figure 6:
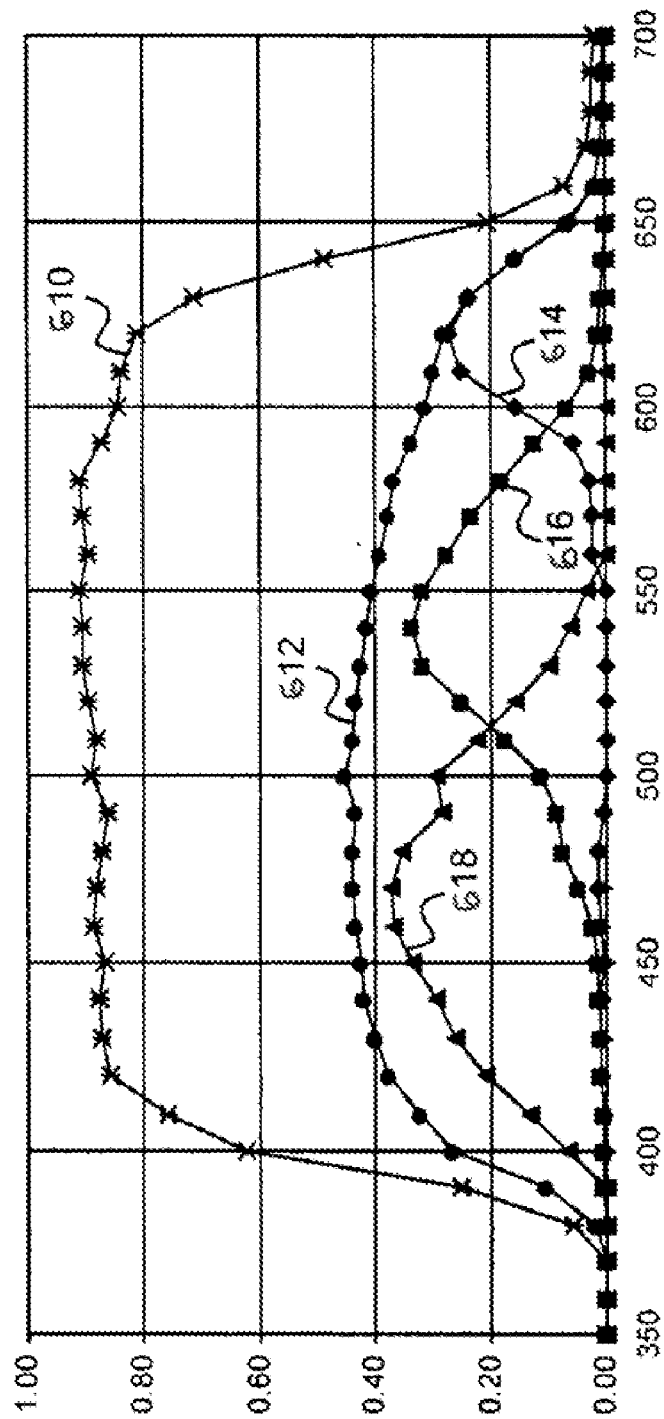
FIG. 6 provides representative spectral quantum efficiency curves for red, green, and blue pixels, as well as a wider spectrum panchromatic quantum efficiency, all multiplied by the transmission characteristics of an infrared cut filter.

Referring to the graph of FIG. 6, there are shown the relative spectral sensitivities of pixels with red, green, and blue color filters in a typical camera application. The X-axis in FIG. 6 represents light wavelength in nanometers, spanning wavelengths approximately from the near ultraviolet to near infrared, and the Y-axis represents efficiency (normalized). In FIG. 6, a curve 610 represents the spectral transmission characteristic of a typical bandwidth filter used to block infrared and ultraviolet light from reaching the image sensor. Such a filter is needed because the color filters used for image sensors typically do not block infrared light, hence the pixels can be unable to distinguish between infrared light and light that is within the passbands of their associated color filters. The infrared blocking characteristic shown by curve 610 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 610 to produce the combined system quantum efficiencies represented by a curve 614 for red, a curve 616 for green, and curve 618 for blue. It is understood from these curves that each color photoresponse is sensitive to only a portion of the visible spectrum. By contrast, the photoresponse of the same silicon sensor that does not have color filters applied (but including the infrared blocking filter characteristic) is shown by a curve 612; this is an example of a panchromatic photoresponse. By comparing the color photoresponse curves 614, 616, and 618 to a panchromatic photoresponse curve 612, it is clear that the panchromatic photoresponse can be two to four times more sensitive to wide spectrum light than any of the color photoresponses.

Initially, each low-resolution Bayer pattern 504 pixel has one color value—red, blue or green. There are many ways to compute luminance values from this starting point. One method is to perform color filter array interpolation to generate red, green and blue values at all pixels. Color filter array interpolation algorithms are well-known in the art and reference is made to the following patents: U.S. Pat. Nos. 5,506,619, 5,629,734, and 5,652,621. Luminance values at each pixel are computed from the interpolated red, green and blue values at each pixel. Once luminance values have been computed, the interpolated color filter array values can be discarded. If the interpolation algorithm is a linear function, it can be combined with the subsequent luminance function to form a single linear equation expressing a pixel luminance value as a linear combination of the available color filter array values. In another method of computing luminance values, the red, green and blue values in a 2×2 neighborhood, or larger, can be averaged over the neighborhood and can be used to compute an average luminance value for the entire neighborhood.

In step 208, the panchromatic channel is used along with the luminance channel and color channels to determine defective pixels. This is followed by improving the defective pixels in step 210. Initially, the panchromatic channel is summed as illustrated in FIG. 7A. FIG. 7A illustrates this process for a portion of the image sensor. In this figure, pairs of panchromatic pixels 702 from the panchromatic readout 502 are summed to generate a panchromatic channel 704 at the same spatial resolution as the luminance channel 256. At this point, the panchromatic or luminance channels can be filtered to reduce noise. Subsequently, various approaches can be employed to determine defective pixels 208 and improve defective pixels 210. In one method, a defective pixel is defined as any pixel for which the luminance value does not match the corresponding summed panchromatic value. In this case, the defective pixel is improved by computing the color difference at that pixel, defined as C–L, where C is the color value (red, green or blue value depending on the pixel), and L is the corresponding luminance value. This color difference is added to the summed panchromatic value: $\hat{C}=C-L+\overline{P}$, where $\hat{C}$ is the improved color value, and $\overline{P}$ is the summed panchromatic value. The use of color differences is preferred when the pixel values are represented in a log space. Alternatively, when the pixel values are represented in a linear space, the color values can be multiplicatively scaled by the ratio $\overline{P}/L$.

Figure 7B:
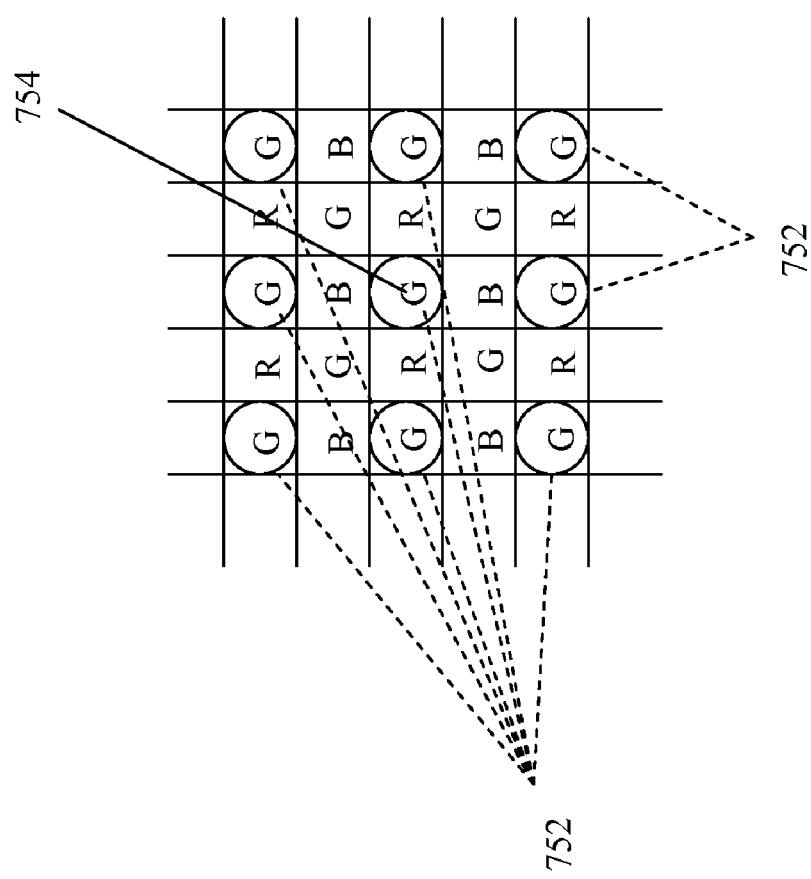
FIG. 7B is a view of pixels contributing to a color difference calculation.

In another method of determining defective pixels 208 and improving defective pixels 210, all pixels are initially classified as defective. For each pixel, color differences (C–L) are averaged in a window of radius k pixels. The average is restricted to pixels of matching spatial location in the Bayer pattern, as illustrated in FIG. 7B. In this figure, a radius of 2 surrounding a central green pixel is shown. In this figure, nine circled pixels 752 contribute to the calculation of the color differences for improving a central pixel 754. The average color difference value is added back to the corresponding panchromatic value to produce an improved color value.

For a given pixel (i,j), this series of steps is given by the following equations:

$$C_{Diff}(i,j) = \frac{\sum_{m=i-k}^{i+k}\sum_{n=j-k}^{j+k} I((i,j),(m,n)) \cdot (C(m,n) - L(m,n))}{\sum_{m=i-k}^{i+k}\sum_{n=j-k}^{j+k} I((i,j),(m,n))}$$

where:

$$I((i,j),(m,n)) = \begin{cases} 1 & \text{if } \mod(i-m,2) = 0 \text{ and } \mod(j-n,2) = 0 \\ 0 & \text{else.} \end{cases}$$

I is an indicator function to restrict inclusion to those pixels of the same Bayer pattern spatial location and thus necessarily having the same color as the central pixel being improved. $C_{Diff}$ is the average color difference. Finally, the improved pixel having improved color value is given by:

$$C_{improved}(i,j) = \text{Pan}(i,j) + C_{Diff}(i,j).$$

In another method of detecting defective pixels 208 and improving defective pixels 210, all pixels are initially classified as defective. For each pixel, color differences (C–L) are averaged in a window of k pixels among all locations where the luminance value is sufficiently similar to the reference pixel panchromatic value, and for which the spatial location of the pixel matches the spatial location of the reference pixel within the Bayer pattern. One preferred way of determining sufficiently similar values is to define an expected noise standard deviation, σ, associated with the reference pixel panchromatic value. Then, a threshold of 4σ is used to identify similar luminance values. Pixels whose luminance value differs with the reference pixel panchromatic value by no more than 4σ are considered similar, and the corresponding color differences are included in the color difference average.

The pixel color value is improved by adding back the reference panchromatic value to the average color difference. Pixels for which the panchromatic value has no sufficiently similar neighboring luminance values are skipped during this stage, and improved color values for these locations are generated subsequently.

For a given pixel (i,j), this series of steps is given by the following equations:

$$C_{Diff}(i,j) = \frac{\sum_{m=i-k}^{i+k}\sum_{n=j-k}^{j+k} I((i,j),(m,n)) \cdot (C(m,n) - L(m,n))}{\sum_{m=i-k}^{i+k}\sum_{n=j-k}^{j+k} I((i,j),(m,n))}$$

where:

$$I((i,j),(m,n)) = \begin{cases} 1 & \mod(i-m,2) = 0 \text{ and } \mod(j-n,2) = 0 \text{ and} \\ & |\text{Pan}(i,j) - L(m,n)| \le 4\sigma \\ 0 & \text{else} \end{cases}$$

I is an indicator function to restrict inclusion to those sufficiently similar pixels of the same Bayer pattern spatial location and thus necessarily having the same color as the central pixel being improved. $C_{Diff}$ is the average color difference. Finally, the improved pixel has color value given by:

$$C_{improved}(i,j) = \text{Pan}(i,j) + C_{Diff}(i,j).$$

This step is referred to hereafter as the pixel matching step.

A final step is required to compute improved color values for all pixels which are skipped during the pixel matching step. In the following, this step is referred to as void filling. Let V refer to the set of pixels which are skipped during the pixel matching step. In one method of the present invention, void filling is achieved by assigning a weight to all pixels in V as a function of the pixel's panchromatic value as well as panchromatic values of neighboring pixels of the same spatial location within the Bayer pattern for which improved color values have already been calculated. The pixels are sorted according to their weight, and the pixel with the highest weight has an improved color value computed as a function of the pixel's panchromatic value as well as color difference values associated with neighboring panchromatic and improved color values. After an improved color value is computed, the selected pixel is removed from the set V, remaining pixel weights are recalculated and the process is repeated until the set V is empty.

Figure 8:
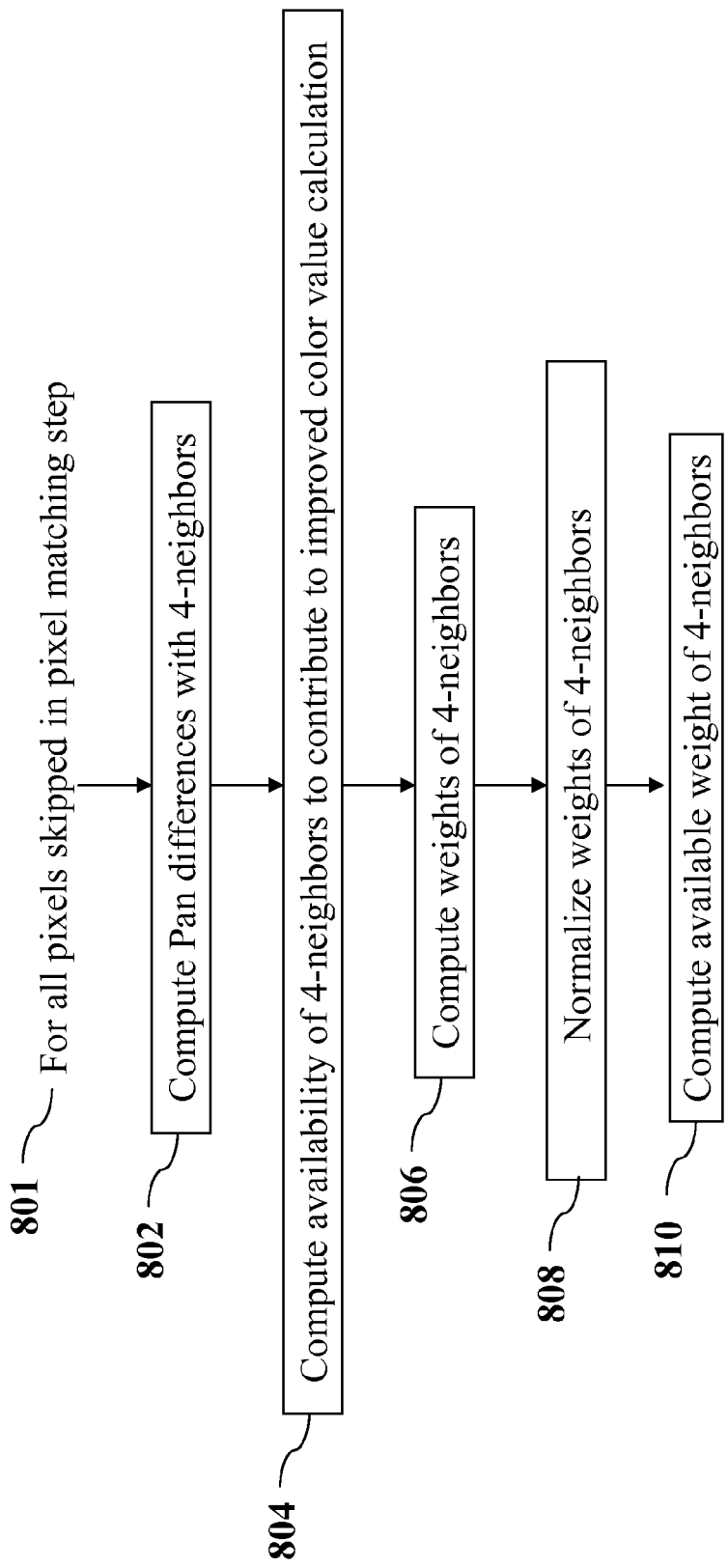
FIG. 8 is a flow diagram of part of a defective pixel detection and improvement step of the present invention.
Figure 9:
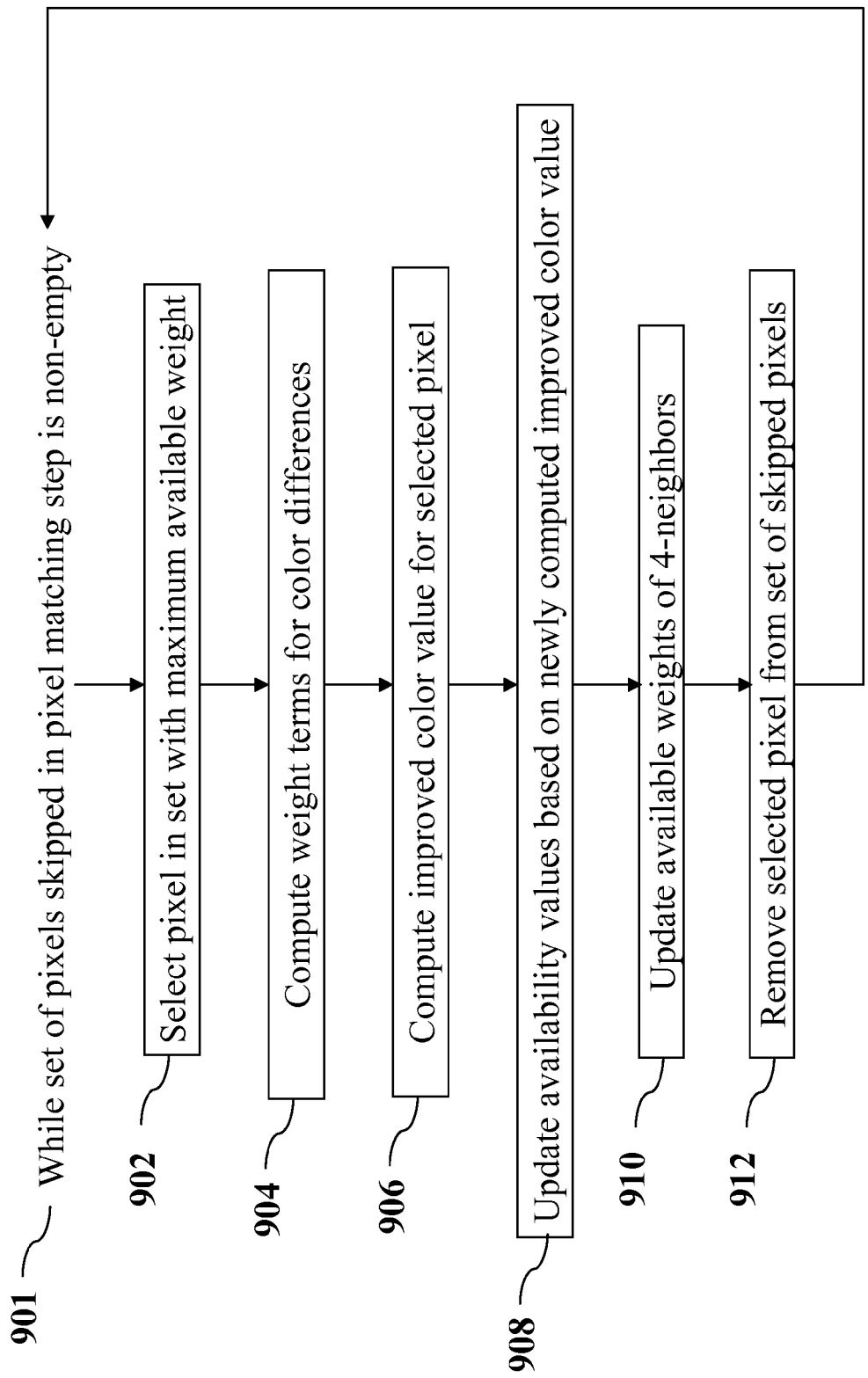
FIG. 9 is a flow diagram of part of a defective pixel detection and improvement step of the present invention.

The steps associated with one method of void filling are described in greater detail in FIGS. 8 and 9. Initially, the set V is defined:

$$V = \{(i,j) | (i,j) \text{ skipped in pixel matching step}\}.$$

Then, for each pixel in V 801, panchromatic differences are computed between that pixel and its four nearest neighbors (4-neighbors) of the same Bayer pattern spatial location 802. The equation below illustrates the computation for the pixel neighbor to the north. Similar equations are used to compute panchromatic differences for neighbors to the south, east and west.

$$\forall (i,j) \in V \ PanDiff_{(i,j)}(i,j-2) = \begin{cases} 0 & \text{if } (i,j-2) \text{ is not a valid pixel index} \\ |\text{Pan}(i,j) - \text{Pan}(i,j-2)| & \text{else.} \end{cases}$$

Additionally, for each pixel (i,j) in V, the set of available 4-neighbors, $A_{(i,j)}$, that can contribute to its improved color value calculation is determined 804. A 4-neighbor is considered available and included in the set $A_{(i,j)}$ if the neighbor already has a computed improved color value:

$$\forall\,(i,\,j) \in V\ A_{(i,j)} =$$

$$\left\{(m,n) \,\middle|\, \begin{array}{l} (m,n) \text{ is valid pixel index, } (m,n) \text{ is 4neighbor of } (i,j), \\ \text{and } (m,n) \text{ has improved color value computed} \end{array}\right\}$$

For each pixel in V, weights are computed for each 4-neighbor 806:

$$\forall\,(i,\,j) \in V$$

$$W_{(i,j)}(m,n) =$$

$$\begin{cases} 0 & \text{if } (m,n) \text{ is not a valid 4neighbor pixel index} \\ \max\!\left(0,\, 5 - \left\lfloor \dfrac{PanDiff_{(i,j)}(m,n)}{2\sigma(\text{Pan}(i,j))} \right\rfloor\right) & \text{else,} \end{cases}$$

where σ(Pan(i,j)) is the standard deviation of the noise associated with the panchromatic value for pixel (i,j). These weights are normalized so that they sum to one 808. In the remaining discussion, W refers to the normalized weights. Finally, an available weight term 810 is calculated for each pixel in V. The available weight represents the fraction of the normalized weight that corresponds to pixels for which an improved color value has already been computed.

$$\forall\,(i,\,j) \in V\ O(i,\,j) = \sum_{(m,n)\in A_{(i,j)}} W_{(i,j)}(m,n).$$

Now referring to FIG. 9, a loop is initiated 901 that in each iteration identifies the pixel in V with the largest available weight, computes an improved color value for that pixel, removes that pixel from V, and updates availability sets and available weights. In particular, the pixel (i,j) in V with the largest available weight is selected 902. For each 4-neighbor of (i,j), the color difference weight is calculated 904. This is a weight that is normalized according to the available weight for (i,j):

$$D_{(i,j)}(m,n) = \frac{W_{(i,j)}(m,n)}{O(i,j)}.$$

Using these color difference weights, an improved color value is computed for the selected pixel 906:

$$\hat{C}(i,j) = \text{Pan}(i,j) + \sum_{(m,n)\in A_{(i,j)}} D_{(i,j)}(m,n) \cdot (C(m,n) - \text{Pan}(m,n)).$$

After the improved color value has been computed, availability sets are updated to reflect the newly generated improved color value 908:

∀(m,n)|(m,n) is 4neighbor of (i,j), (m,n)∈V A(m,n)=A(m,n)∪(i,j).

Similarly, available weight terms are updated 910:

∀(m,n)|(m,n) is 4neighbor of (i,j), (m,n)∪V O(m,n)=O(m,n)+W(m,n)(i,j)

Finally, pixel (i,j) is removed from the set V 912.

V=V\(i,j).

This loop is iterated until the set V is empty 901.

The improved color values along with the original panchromatic channel 252 represent an improved color filter array image 212, in this particular example corresponding to an image sensor with the color filter array pattern shown in FIG. 3 and the binning strategy during readout given by 412 in FIG. 4.

Figure 10:
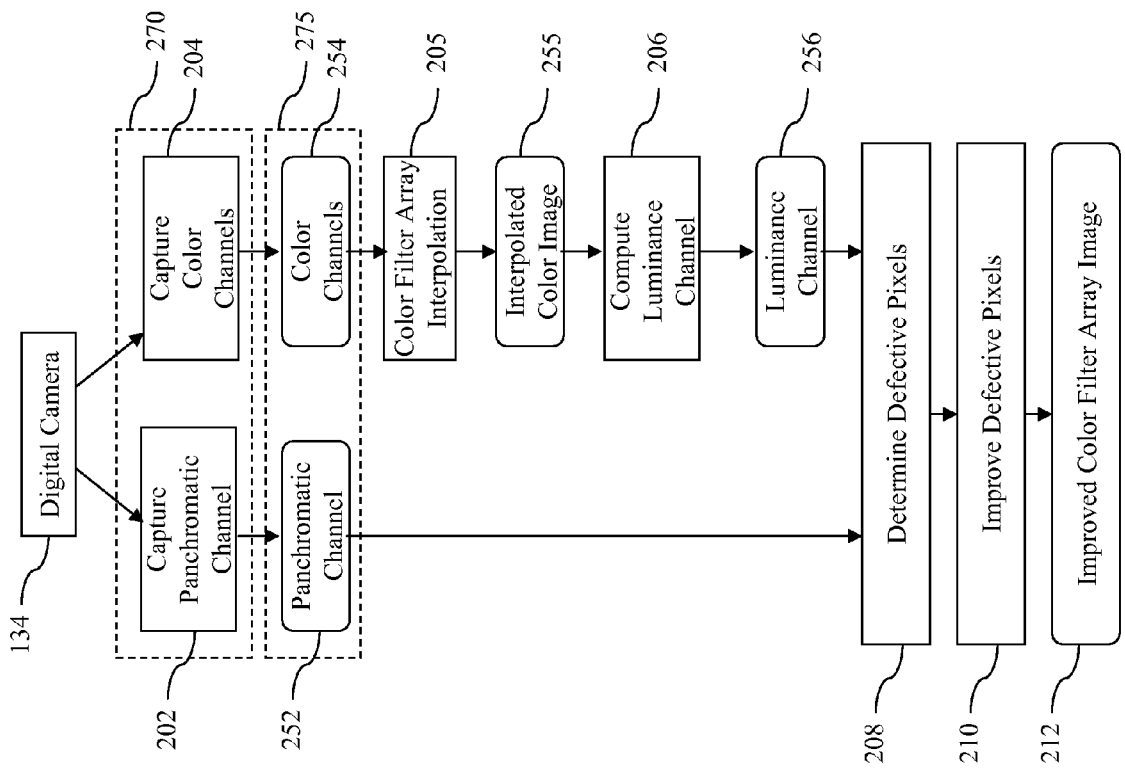
FIG. 10 is a flow diagram of an alternative embodiment of the present invention.

Another embodiment of the present invention is illustrated in FIG. 10. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. A color filter array interpolation 205 is performed on the color channels 254 to generate an interpolated color image 255 with red, green and blue values at every pixel. The interpolated color image 255 is used to compute the luminance channel 206, producing a computed luminance channel 256. Subsequently, defective pixels are detected 208 and improved 210, and an improved color filter array image is produced 212.

During the detection of defective pixels 208 and improvement of defective pixels 210, at each pixel the color channel present in the Bayer pattern at that pixel is altered. The other two color channel values for that pixel are used in computations, but are left unaltered, and are eventually discarded. For example, given a red Bayer pattern pixel, a red color value at that pixel is improved. This improvement process can use both neighboring original color values as well as interpolated color values. The interpolated green and blue color values at that pixel can be used in the detection and improvement of that and other defective pixels, but are eventually discarded. When the improved color channels are combined with the original panchromatic channel 252, the final result is an improved color filter array image 212.

Figure 11:
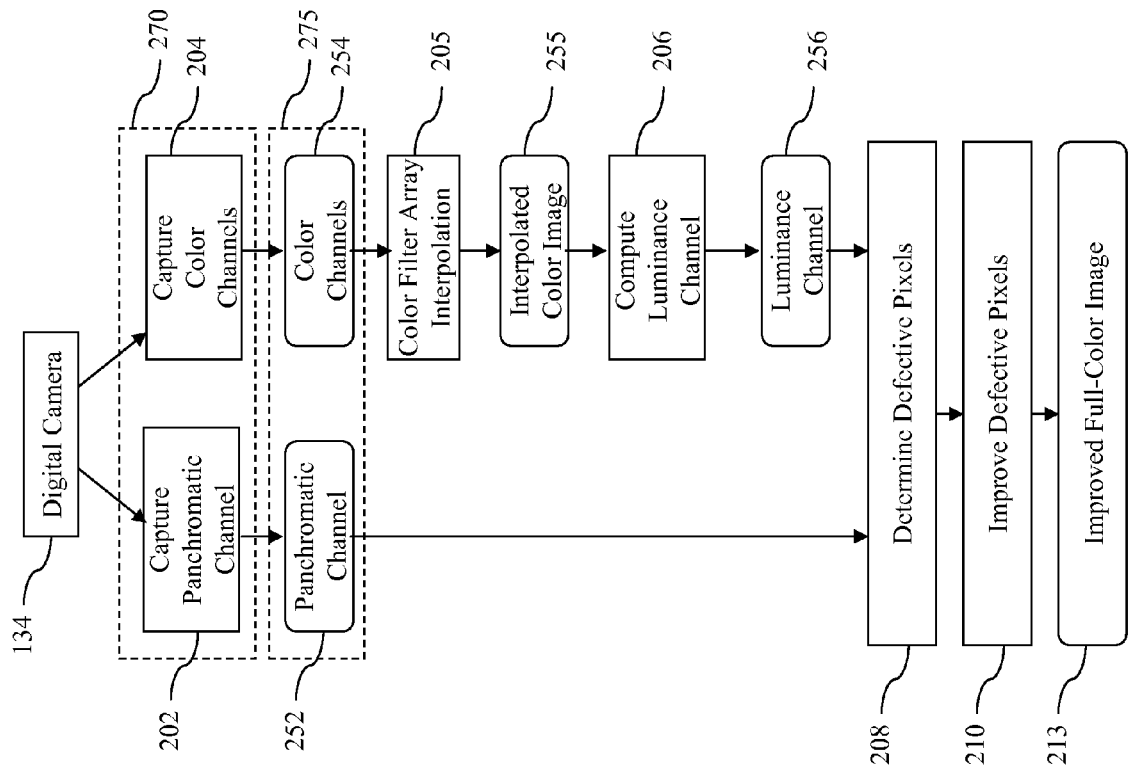
FIG. 11 is a flow diagram of an alternative embodiment of the present invention.

Another embodiment of the present invention is illustrated in FIG. 11. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. Color filter array interpolation 205 is performed on the color channels 254 to generate an interpolated color image 255 with red, green and blue values at every pixel. The interpolated color image 255 is used to compute the luminance channel 206, producing a computed luminance channel 256. Subsequently, defective pixels are detected 208 and improved 210, and an improved full-color image is produced 213.

During the detection of defective pixels 208 and improvement of defective pixels 210, at each pixel all three color channel values are analyzed to detect and improve defective pixels. Improved color values can be generated for all three color channels. When the improved color channels are combined with the original panchromatic channel 252, the final result is an improved full-color image.

Figure 12:
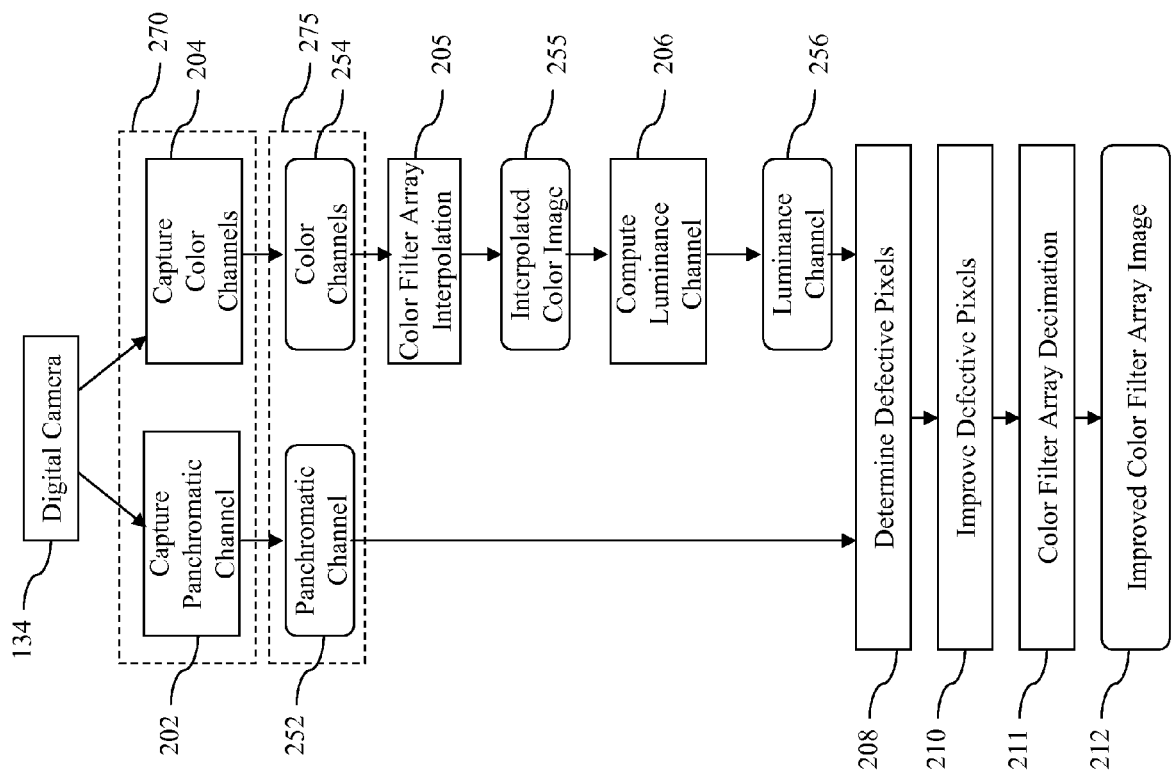
FIG. 12 is a flow diagram of an alternative embodiment of the present invention.

Another embodiment of the present invention is illustrated in FIG. 12. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. Color filter array interpolation 205 is performed on the color channels 254 to generate an interpolated color image 255 with red, green and blue values at every pixel. The interpolated color image 255 is used to compute the luminance channel 206, producing a computed luminance channel 256. Subsequently, defective pixels are detected 208 and improved 210. A color filter array decimation 211 is used to reduce the full-color image to an improved color filter array image 212.

During the detection of defective pixels 208 and improvement of defective pixels 210, at each pixel all three color channel values are analyzed to detect and improve defective pixels. Improved color values are generated for all three color channels. The resulting image is then decimated back to the color filter array pattern 211, and combined with the original panchromatic channel 252 to produce an improved color filter array image 212. This particular embodiment is relevant in the case that it is desired to generate an improved color filter array image 212, however, the steps to detect defective pixels 208 and improve defective pixels 210 benefit from having improved color values determined and maintained at all pixels for all color channels throughout the detection and improvement steps.

Figure 13:
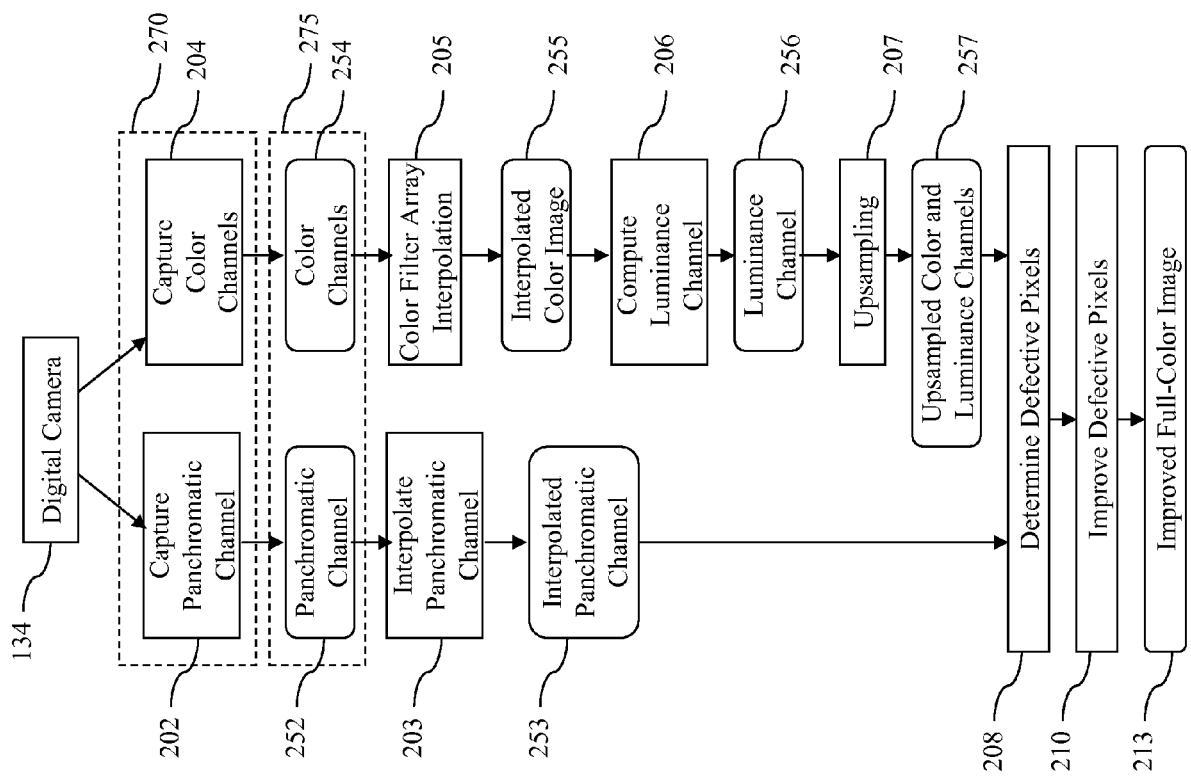
FIG. 13 is a flow diagram of an alternative embodiment of the present invention.

Another embodiment of the present invention is illustrated in FIG. 13. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. The panchromatic channel 252 is interpolated 203 to produce an interpolated panchromatic channel 253. Color filter array interpolation 205 is performed on the color channels 254 to generate an interpolated color image 255 with red, green and blue values at every pixel. The interpolated color image 255 is used to compute the luminance channel 206, producing a computed luminance channel 256. The interpolated color image 255 and luminance channel 256 are up-sampled 207 to generate up-sampled color and luminance channels 257 at the same resolution as the interpolated panchromatic channel 253. Up-sampling is well known in the art, and familiar techniques such as bilinear interpolation can be used for the task. Subsequently, defective pixels are detected 208 and improved 210, and an improved full-color image is produced 213.

During the detection of defective pixels 208 and improvement of defective pixels 210, at each pixel all three color channel values are analyzed to detect and improve defective pixels. Improved color values can be generated for all three color channels. When the improved color channels are combined with the interpolated panchromatic channel 253, the final result is an improved full-color image 213.

In other embodiments of the present invention, an additional step of motion estimation and compensation is included to align the panchromatic channel with the color and luminance channels prior to the detection and improvement of defective pixels. Since the panchromatic channel has an exposure time different from at least one of the color channels, it can be that when there is motion in the captured scene—either camera motion or object motion—the image content contained in the panchromatic channel is not initially aligned with the image content contained in the color and luminance channels. In this situation, it is beneficial to include a motion estimation and compensation step to align the color and luminance channels with the panchromatic channel, prior to detection and improvement of defective pixels.

Figure 14:
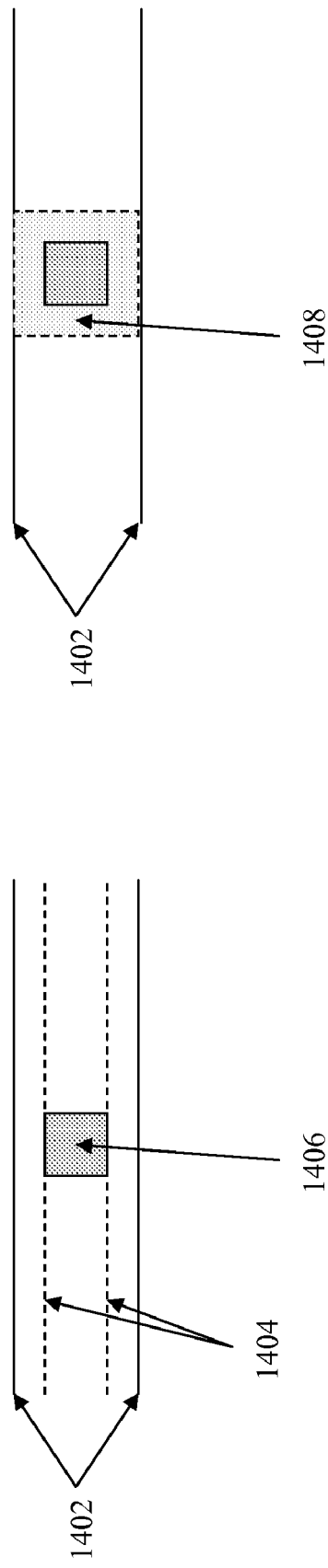
FIG. 14 is an illustration of block motion estimation according to the present invention.

In one method of performing motion estimation and compensation, the luminance channel is used to spatially align the color channels with the panchromatic channel. Motion estimation and compensation techniques are well-known in the art, and vary in accuracy, robustness, and computational complexity. Motion models and techniques include: affine models, block-based translational motion and dense motion fields from optical flow algorithms. In one method of motion estimation and compensation in a memory-constrained environment, a small number of sensor pixel rows are readout and buffered in memory at a given time. Block-based translational motion is used to provide a fast, local motion model. The size of the blocks and the search range used to match blocks can be chosen in part depending on the number of rows of pixels available in the buffer. For example as illustrated in FIG. 14, given a buffer with 16 lines available for each channel 1402, the central eight rows of the panchromatic channel 1404 can be divided into 8 by 8 blocks 1406 and the corresponding rows of the luminance channel can be searched with a motion range of up to 4 pixels 1408 to identify a matching block. Block-matching statistics can be kept for each block and used in subsequent analysis. Such statistics include the error associated with the preferred match, as well as the ratio between the average error across all offsets and the minimum error.

Once motion offsets have been determined for all blocks in the current stripe of rows, the offsets are further processed to enforce regularity and reduce the influence of noise on the motion estimates. This can be achieved by median filtering the motion offsets, using available motion data from current and previous rows. In order to avoid median filtering across strong edges, the computed block-matching statistics can be used to pass blocks unchanged through the median filter. In particular, a high ratio between the average error and minimum error suggests a strong match and substantial image content. Blocks whose average error to minimum error ratio exceeds a preset threshold are excluded from the median filter.

Different motion estimation techniques can be used in alternative implementations. In a scenario in which buffer memory is less constrained and the entire, or nearly entire, color filter array image can be stored in memory prior to processing, more complicated motion analysis can be used. Optical flow techniques can be used to generate a motion vector for every pixel. Larger search ranges can be used for block motion estimation. In a scenario in which the panchromatic channel exposure period is roughly centered within the longer exposure period of the color channels, motion estimation and compensation can be skipped entirely or else used with a reduced search range, reducing the overall complexity of the processing algorithms.

Once the motion estimation step is completed, the color and luminance channels are adjusted according to the motion estimates to align with the underlying panchromatic channel.

Figure 15:
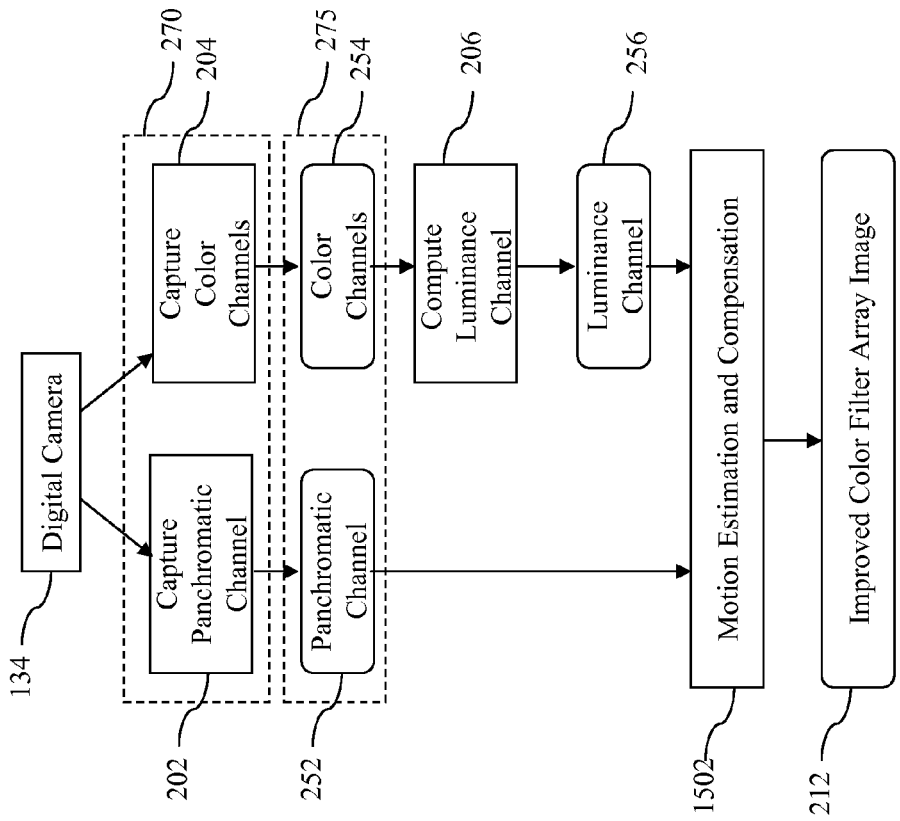
FIG. 15 is a flow diagram of an alternative embodiment of the present invention.

One embodiment of the present invention incorporating motion estimation and compensation is illustrated in FIG. 15. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. The color channels 254 are used to compute the luminance channel 206. At this point, the luminance channel 256 is used in conjunction with the panchromatic channel 252 to estimate and compensate for motion between the panchromatic and color/luminance data 1502. To ensure that the motion compensated color filter array image maintains the Bayer pattern for color values, motion estimates are restricted to be translational offsets which are a multiple of 2 pixels in each of the horizontal and vertical directions. The step of motion estimation and compensation produces improved color channels. When the improved color channels are combined with the original panchromatic channel 252, the final result is an improved color filter array image 212.

Figure 16:
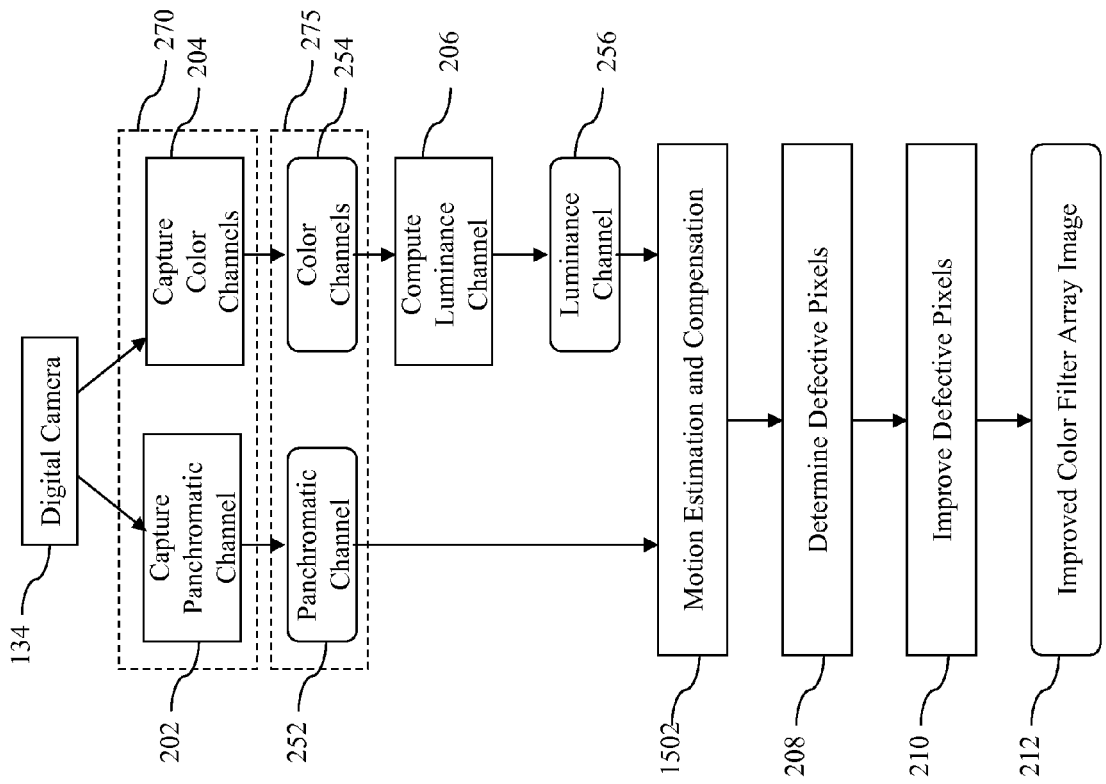
FIG. 16 is a flow diagram of an alternative embodiment of the present invention.

Another embodiment of the present invention is illustrated in FIG. 16. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. The color channels 254 are used to compute the luminance channel 206. At this point, the luminance channel 256 is used in conjunction with the panchromatic channel 252 to estimate and compensate for motion between the panchromatic and color/luminance data 1502. To ensure that the motion compensated color filter array image maintains the Bayer pattern for color values, motion estimates are restricted to be translational offsets which are a multiple of 2 pixels in each of the horizontal and vertical directions. Subsequently, defective pixels are detected 208 and improved 210, and an improved color filter array image is produced 212.

Figure 17:
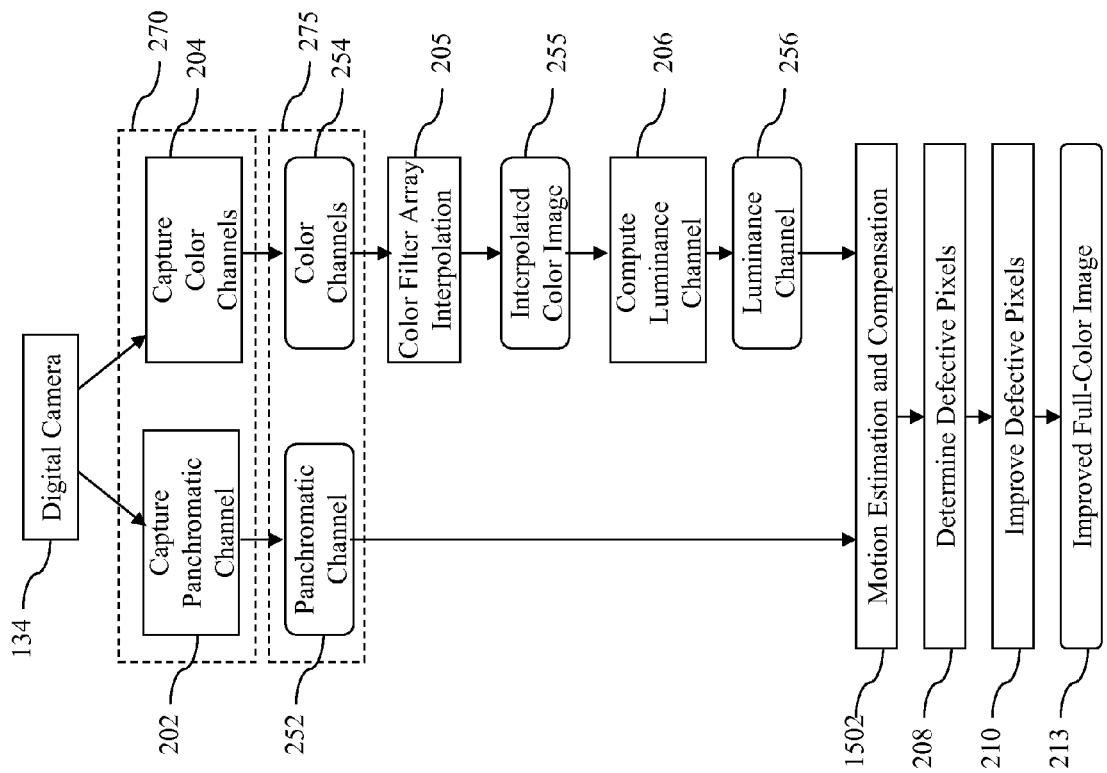
FIG. 17 is a flow diagram of an alternative embodiment of the present invention.

Another embodiment of the present invention is illustrated in FIG. 17. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. Color filter array interpolation 205 is performed on the color channels 254 to generate an interpolated color image 255 with red, green and blue values at every pixel. The interpolated color image 255 is used to compute the luminance channel 206. At this point, the luminance channel 256 is used in conjunction with the panchromatic channel 252 to estimate and compensate for motion between the panchromatic and color/luminance data 1502. Subsequently, defective pixels are detected 208 and improved 210, and an improved full-color image is produced 213.

During the detection of defective pixels 208 and improvement of defective pixels 210, at each pixel all three color channel values are analyzed to detect and improve defective pixels. Improved color values can be generated for all three color channels. When the improved color channels are combined with the original panchromatic channel 252, the final result is an improved full-color image 213.

Figure 18:
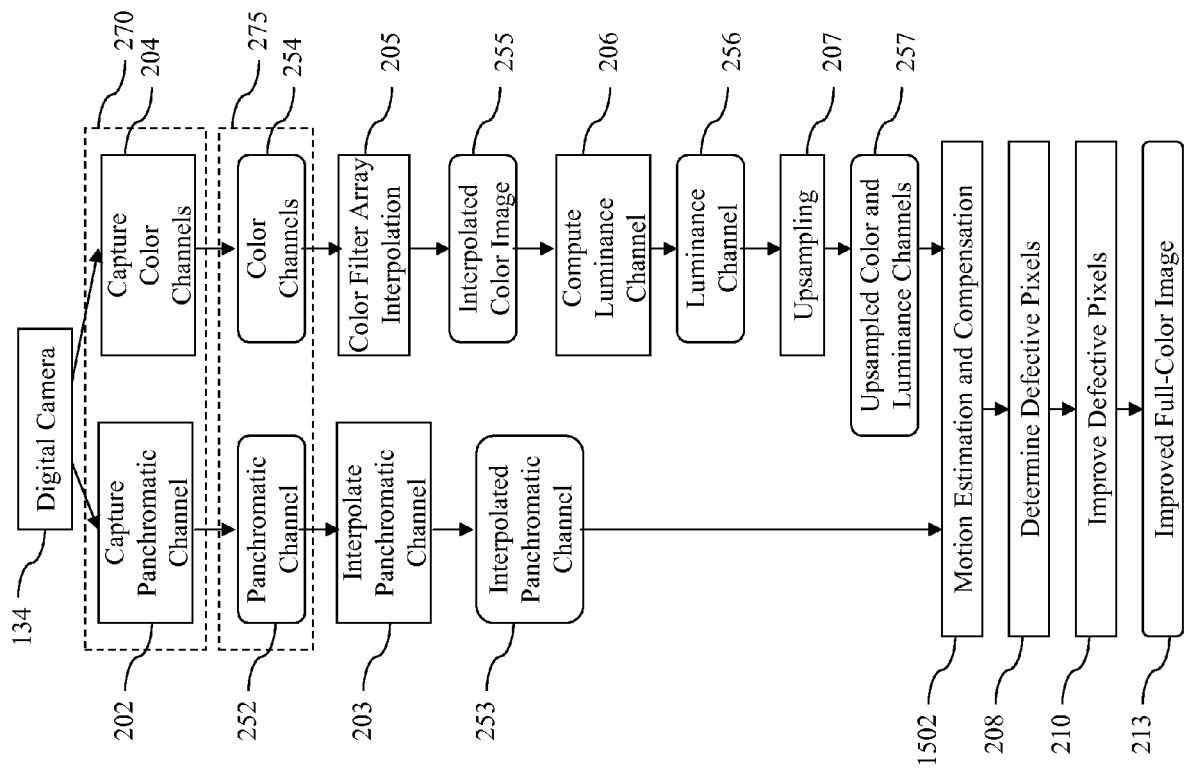
FIG. 18 is a flow diagram of an alternative embodiment of the present invention.

Another embodiment of the present invention is illustrated in FIG. 18. In this embodiment, a digital camera 134 is used to capture a color filter array image 270. More specifically, the digital camera 134 captures a panchromatic channel 202 and color channels 204. The color filter array image 275 is captured in such a way that the panchromatic channel 252 is exposed to light for a different length of time that at least one of the color channels 254. The panchromatic channel 252 is interpolated 203 to produce an interpolated panchromatic channel 253. Color filter array interpolation 205 is performed on the color channels 254 to generate an interpolated color image 255 with red, green and blue values at every pixel. The interpolated color image 255 is used to compute the luminance channel 206. The interpolated color image 255 and luminance channel 256 are up-sampled 207 to produce up-sampled color and luminance channels 257 at the same resolution as the interpolated panchromatic channel 253. At this point, the up-sampled luminance channel 257 is used in conjunction with the interpolated panchromatic channel 253 to estimate and compensate for motion between the panchromatic and color/luminance data 1502. Subsequently, defective pixels are detected 208 and improved 210, and an improved full-color image is produced 213.

During the detection of defective pixels 208 and improvement of defective pixels 210, at each pixel all three color channel values are analyzed to detect and improve defective pixels. Improved color values can be generated for all three color channels. When the improved color channels are combined with the interpolated panchromatic channel 253, the final result is an improved full-color image 213.

Those skilled in the art will recognize that there are many alternative methods to the present invention. For example, the color pixels can be left unbinned, as in 408 of FIG. 4. In this case, the color filter array interpolation 205 and up-sampling steps 207 can be modified to account for the unbinned color pixels. More generally, those skilled in the art will recognize that the present invention can be applied to any sensor pattern of panchromatic pixels and color pixels such that the exposure period of the panchromatic channel differs from the exposure period of at least one color channel.

In another method of the present invention, the sensor pattern contains red, green, and blue pixels, and the pixels are divided into subsets such that one subset contains green pixels, and has an exposure period different from the remaining pixels.

In another method of the present invention, the sensor is divided into more than two subsets of pixels, each of which has an exposure period different from the other subsets.

Figure 19:
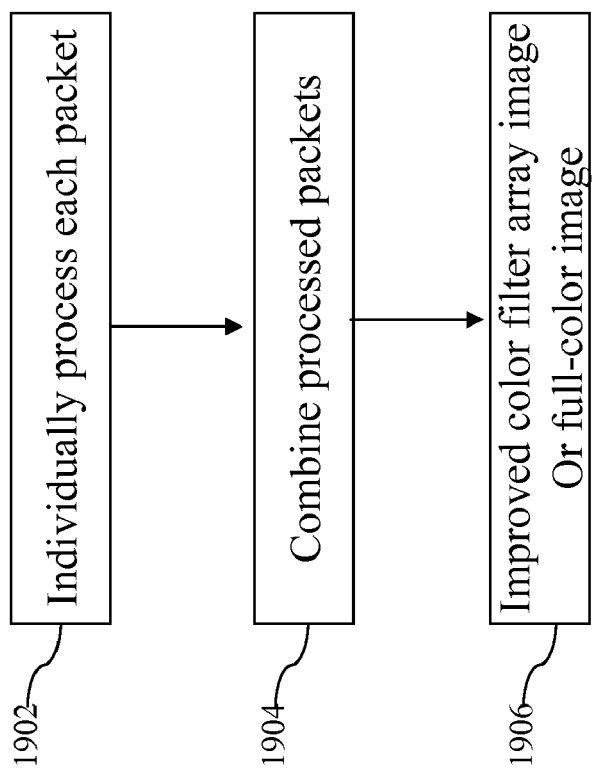
FIG. 19 is a flow diagram of an embodiment of the present invention involving multiple readouts.
Figure 20:
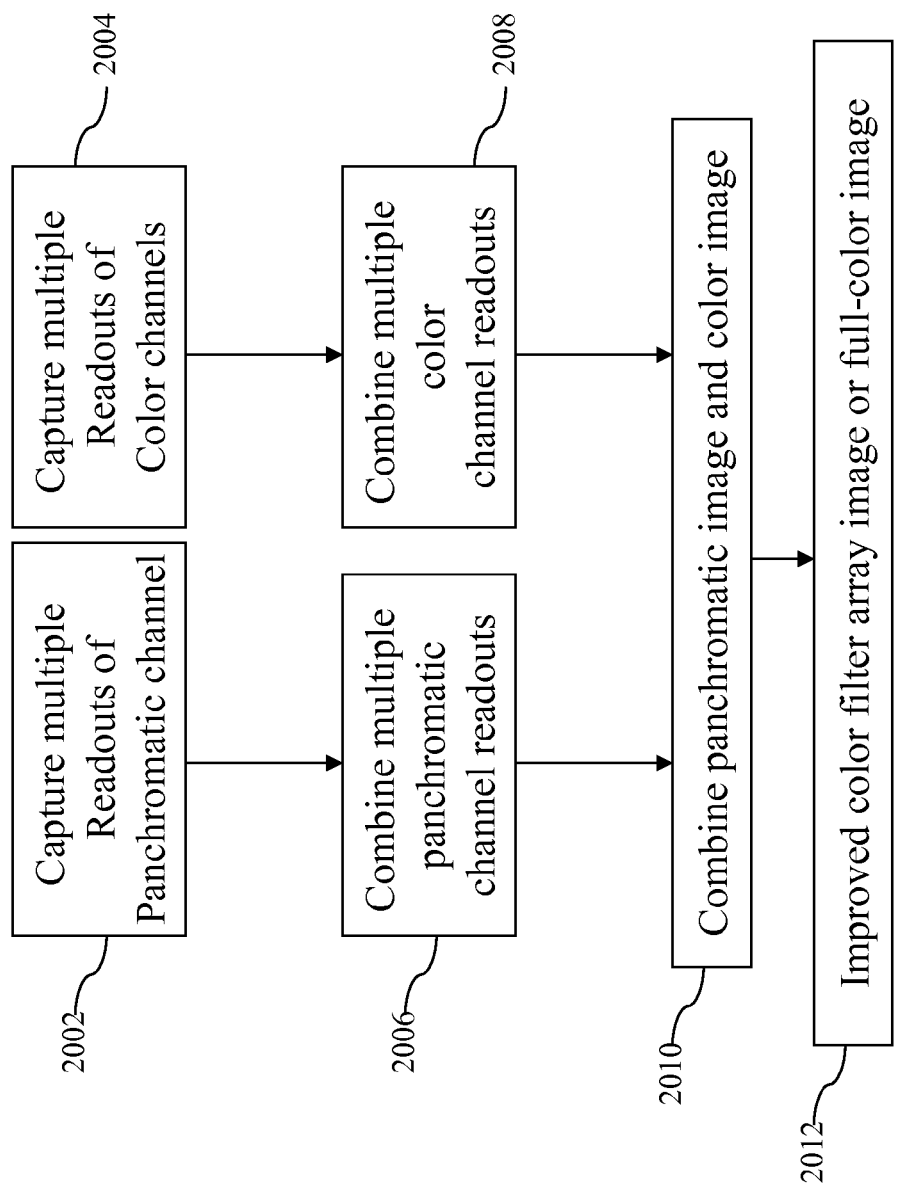
FIG. 20 is a flow diagram of an embodiment of the present invention involving multiple readouts.

In another method of the present invention, the sensor is divided into two subsets of pixels, each of which is read at least once, and multiple readings of the pixel subsets are combined to form a single improved color filter array image or full-color image. Such a scheme is illustrated in FIGS. 19 and 20. Referring to FIG. 19, the capture process is divided into a collection of packets. Each packet is read and processed individually 1902, and the results from each packet processing step are combined 1904 into a single improved color filter array image or full-color image 1906.

FIG. 20 illustrates in more detail the processing of an individual packet. A packet includes one or more readouts of a panchromatic channel 2002, as well as one or more readouts of color channels 2004. The panchromatic channel readouts are combined into a single panchromatic image 2006. Likewise, the color channel readouts are combined into a single color image 2008. Subsequent processing is used to combine the color and panchromatic images 2010 into a single improved color filter array image or full-color image 2012.

In another method of the present invention, the digital camera 134 operates in video capture mode. Each frame of video is captured and processed according to the teachings of the present invention. Additional processing can be included to reduce the resolution of each frame to the target video resolution. Similarly, the digital camera 134 can operate in a burst capture mode, in which case each frame is captured and processed according to the teachings of the present invention.

The invention has been described in detail with particular reference to certain preferred embodiments thereof, but it will be understood that variations and modifications can be effected within the scope of the invention as described above,

PARTS LIST

| | |
|---|---|
| 110 | Computer System |
| 112 | Microprocessor-based Unit |
| 114 | Display |
| 116 | Keyboard |
| 118 | Mouse |
| 120 | Selector on Display |
| 122 | Disk Drive Unit |
| 124 | Compact Disk—read Only Memory (CD-ROM) |
| 126 | Floppy Disk |
| 127 | Network Connection |
| 128 | Printer |
| 130 | Personal Computer Card (PC card) |
| 132 | PC Card Reader |
| 134 | Digital Camera |
| 136 | Camera Docking Port |
| 138 | Cable Connection |
| 140 | Wireless Connection |
| 202 | Panchromatic Channel Capture |
| 203 | Panchromatic Channel Interpolation |
| 204 | Color Channels Capture |
| 205 | Color Filter Array Interpolation |
| 206 | Luminance Channel Computation |
| 207 | Up-sampling |
| 208 | Defective Pixel Determination |
| 210 | Defective Pixel Improvement |
| 211 | Color Filter Array Decimation |
| 212 | Improved Color Filter Array Image |
| 213 | Improved Full-Color Image |
| 252 | Panchromatic Channel |
| 253 | Interpolated Panchromatic Channel |
| 254 | Color Channels |
| 255 | Interpolated Color Image |
| 256 | Luminance Channel |
| 257 | Up-sampled Color and Luminance Channels |
| 270 | Color Filter Array Image Capture |
| 275 | Color Filter Array Image |
| 301 | Color Filter Array Pattern |
| 302 | Panchromatic Pixel |
| 304 | Red Color Pixel |
| 306 | Green Color Pixel |
| 308 | Blue Color Pixel |
| 401 | First Partial Row of Image Sensor |
| 402 | Second Partial Row of Image Sensor |
| 404 | Floating Diffusion |
| 406 | Pixel Quartet |
| 408 | First Readout Combination |
| 410 | Second Readout Combination |
| 412 | Third Readout Combination |
| 502 | Panchromatic Pixels |
| 504 | Color Pixels |
| 610 | Curve |
| 612 | Curve |
| 614 | Curve |
| 616 | Curve |
| 618 | Curve |
| 702 | Panchromatic Pixel Pair |
| 704 | Low Resolution Panchromatic Pixels |
| 752 | Contributing Pixels |
| 754 | Improved Pixel |
| 801 | Pixel Selection |
| 802 | Panchromatic Pixel Differences Calculation |
| 804 | Pixel Availability Calculation |
| 806 | Weight Calculation |
| 808 | Weight Normalization |
| 810 | Available Weight Calculation |
| 901 | Loop |
| 902 | Pixel Selection |
| 904 | Color Difference Weight Calculation |
| 906 | Improved Pixel Value Calculation |
| 908 | Availability Update |
| 910 | Available Weights Update |
| 912 | Pixel Removal |
| 1402 | Buffer Lines |
| 1404 | Central Buffer Lines |
| 1406 | Pixel Block |
| 1408 | Search Region |
| 1502 | Motion Estimation and Compensation |
| 1902 | Individual Packet Processing |
| 1904 | Packet Combining |
| 1906 | Improved Image |
| 2002 | Multiple Panchromatic Captures |
| 2004 | Multiple Color Captures |
| 2006 | Panchromatic Combining |
| 2008 | Color Combining |
| 2010 | Panchromatic and Color Combining |
| 2012 | Improved Image |

The invention claimed is:

1. A method of improving a first color filter array image from an image sensor having a plurality of color channels and a panchromatic channel, comprising:
    (a) capturing the panchromatic channel at a different exposure time than at least one of the plurality of color channels with the image sensor;
    (b) using the plurality of color channels to provide a luminance channel; and
    (c) analyzing the first color filter array image and the luminance channel to determine defective pixels in the plurality of color channels, wherein a defective pixel is a pixel whose luminance value does not match a corresponding panchromatic value, and using neighboring color and luminance pixel values to improve the defective pixels to produce a second color filter array image or full-color image having at least one improved channel, including
        for each of the defective pixels, computing a color difference between a color value of at least one of the color channels and a luminance value of the luminance channel, and
        adding the color difference to a panchromatic value of the panchromatic channel to improve each defective pixel.

2. The method of claim 1 wherein step (b) further includes producing an interpolated color image and using the interpolated color image to provide the luminance channel.

3. The method of claim 2 wherein step (c) further includes using the interpolated color image in determining and improving the defective pixels.

4. The method of claim 1 wherein the luminance channel is selected such that it is comparable to the panchromatic channel.

5. The method of claim 1, further comprising:
    prior to analyzing the first color filter array image and the luminance channel, perform a motion estimate and compensation on the panchromatic channel and the luminance channel, wherein the analysis is performed based on the motion estimated and compensated panchromatic channel and luminance channel.

6. The method of claim 5 further comprising:
    producing an interpolated color image and using the interpolated color image to provide the luminance channel; and
    producing an interpolated panchromatic channel.

7. The method of claim 5 wherein the luminance channel is selected such that it is comparable to the panchromatic channel.

8. The method of claim 6, further comprising performing an up-sample operation on the interpolated color image and the luminance channel to produce up-sampled color channels and up-sampled luminance channels at an identical resolution as the interpolated panchromatic channel.

9. The method of claim 8, wherein the up-sampled luminance channel is used in conjunction with the interpolated panchromatic channel to estimate and compensate for a motion between panchromatic data, color data, and luminance data.

10. The method of claim 9, wherein the motion estimate and compensation is performed on pixels restricted to be translational offsets of a multiple of two pixels in each of a horizontal direction and a vertical direction.

11. The method of claim 5, wherein performing motion estimate and compensation comprises aligning the plurality of color channels with the panchromatic channel based on the luminance channel.

12. The method of claim 1, further comprising:
classifying all pixels as defective pixels;
for each of the defective pixels, the color differences of neighboring pixels within a predetermined proximity with respect to a corresponding defective pixel are averaged to generate an average color difference value; and
adding the average color difference value to the panchromatic value of the panchromatic channel to generate an improved color value for the corresponding defective pixel, wherein the improved color value is utilized to produce the second color filter array image or the full-color image having at least one improved channel.

13. The method of claim 12, wherein the neighboring pixels are identified having an identical spatial location in a Bayer pattern.

14. The method of claim 13, wherein the neighboring pixels are identified in which a difference between a luminance value of each neighboring pixel and the panchromatic value is less than a predetermined threshold.

15. The method of claim 14, further comprising performing a void filling operation on one or more pixels that are not within the identical spatial location of the Bayer pattern or the difference between the luminance value and the panchromatic value is greater than the predetermined threshold.

16. The method of claim 15, wherein performing the void filling operation comprises:
assigning a weight to each of the pixels as a function of a panchromatic value of each pixel and panchromatic values of the neighboring pixels having an identical spatial location within the Bayer pattern whose improved color values have already been calculated;
sorting the pixels based on weights assigned to the pixels;
selecting one of the pixels having a highest weight amongst all;
computing an improved color value for the selected pixel for the selected pixel;
removing the selected pixel from the sorted pixels; and
repeating the assigning, sorting, selecting, computing, and removing, until all pixels have been processed.

* * * * *